(12) United States Patent
Oh et al.

(10) Patent No.: US 6,493,500 B1
(45) Date of Patent: Dec. 10, 2002

(54) METHOD FOR MID-SPAN BRANCHING OF OPTICAL FIBER CABLE

(75) Inventors: Sung-Keun Oh, Taejeon (KR); Won-Lok Kim, Kyoungki (KR); Won-Cheol Kang, Taejeon (KR)

(73) Assignee: Korea Telecom, Sungnam-shi (KR)

(*) Notice: Subject to any disclaimer, the term of this patent is extended or adjusted under 35 U.S.C. 154(b) by 73 days.

(21) Appl. No.: 09/665,169

(22) Filed: Sep. 19, 2000

(51) Int. Cl.[7] .............................. G02B 6/00; G02B 6/255
(52) U.S. Cl. ............................ 385/135; 385/98; 385/99
(58) Field of Search .............................. 385/100, 106, 385/110, 98, 99, 135, 136, 137

(56) References Cited

U.S. PATENT DOCUMENTS

| | | | | |
|---|---|---|---|---|
| 4,359,262 A | * | 11/1982 | Dolan ......................... | 385/135 |
| 5,402,515 A | * | 3/1995 | Vidacovich et al. ......... | 385/135 |
| 5,528,718 A | * | 6/1996 | Ray et al. .................... | 385/135 |
| 5,590,234 A | * | 12/1996 | Pulido ......................... | 385/134 |
| 5,644,671 A | * | 7/1997 | Goetter et al. ............... | 385/135 |
| 5,657,413 A | * | 8/1997 | Ray et al. .................... | 385/100 |
| 6,112,006 A | * | 8/2000 | Foss ............................ | 385/135 |

OTHER PUBLICATIONS

A New Method of Mid–span Branching of Optical Fibre Cable not Required a Slack Loop (9/20–24/99, ITU–Telecommunication Standardization Sector).

* cited by examiner

Primary Examiner—Brian Sircus
Assistant Examiner—Chaudrika Prasad
(74) Attorney, Agent, or Firm—Staas & Halsey LLP

(57) ABSTRACT

The present invention relates to a method for mid-span branching of optical fiber cable which makes the mid-span branching possible without excess length of the optical fiber cable by forming main branching part and sub branching part for branched cores to be taken out from an existing main cable. It is an object of the present invention to provide a method for mid-span branching that provides marginal length of the existing main cable from which the branch cable branches off without the excess length of cables. To accomplish the above object of the present invention, there is provided a method for mid-span branching of optical fiber cable, comprising the steps of: setting an existing main cable and a branch cable; unsheathing main branched part and sub branched part of the main cable with preserved part; choosing and cutting branched cores with preserved cores remaining uncut; connecting the first branched cores to first branching cores to make temporary connection; pulling out the temporary connection to the sub branched part through the preserved part; and splicing the first branched cores and the first branching cores at the sub branched part, and splicing the second branched cores and second branching cores at the main branching part, second branching cores in the branch cable.

18 Claims, 16 Drawing Sheets

METHOD FOR MID-SPAN BRANCHING OF OPTICAL FIBER CABLE

FIELD OF THE INVENTION

The present invention relates to a method for. mid-span branching of optical fiber cable network and more specifically to a method for mid-span branching of optical fiber cable which makes the mid-span branching possible without excess length of the optical fiber cable.

DESCRIPTION OF THE PRIOR ART

In general, optical fiber cables are installed in the networks of loop distribution, star distribution, or other distribution in consideration of economy and reliability of installation, and flexibility to quantitative change of and diversification of service.

By the loop distribution, as shown in FIG. 1A, the excess length of cables for mid-span branching is ensured beforehand in the manholes or on the poles 1, 2, 3, 4, 5, 6 which are, when the cables are initially installed, the anticipated points for branching. When the demand for the cores arises in the middle of service, branch cable is installed from the point of demand for the cores to the point of the loop distribution network for branching. Also, the branched cores of existing main cable in the network are spliced with the branching cores of the branch cable. Thus the network is of the loop-shape.

By the star distribution, as shown in FIG. 1B, the excess length of cables for mid-span branching is ensured beforehand in the manholes or on the poles 1, 2, 3, 4 which are, when the cables are initially installed, the anticipated points for branching. When the demand for the cores arises in the middle of service, branch cable is installed from the point of demand for the cores to the point of the star distribution network for branching. Also, the branched cores of existing main cable in the network are spliced with the branching cores of the branch cable. Thus the network is of the star-shape.

In branching of the optical fiber network described above, there have been provided methods for access-point branching by which branch cable is branched from the network at the point of access to the point of demand for the cores, and for mid-span branching by which branch cable is branched from the network, not at the point of access but at the mid-point of the network cable, to the point of demand for the cores.

In the method for mid-span branching, to avoid tension on the branching part, the excess length of the cables must be ensured for the minimum length of core of the optical fiber cable for the distance from the branching part to branching device, response to demand for re-access in the case of access-failure, malfunction, operational needs, and etc.

Because the prior arts need the excess length of cables as mentioned above, as shown in FIG. 2A, existing main cable 20 is pulled out from the conduit line 10 in the manhole 1 that is the position of mid-span branching, supported by supporter 30, and the slack loop of cable is assumed. Thus the excess length of the cables is ensured. The cores of the existing main cable 20 and the branch cable 40 are placed in the manhole 1.

As shown in FIG. 2B, the excess length of cables is fastened on the prop 31. Branching part 100 is formed by unsheathing predetermined portions of the loop for the cores of the cable to be taken out. Splice closure is installed at the unsheathed part.

In the case where the excess length of cables either can't be or isn't ensured in the manhole that is supposed to be the position of mid-span branching, as shown in FIG. 3, branch cable 40 is installed in the manhole 2 adjacent to the manhole 1 which is supposed to be the position of mid-span branching. The splice closure 50 is disjointed and the branch cable 40 is branched from the existing main cable 20, which is the access point branching method. Herein, for the mid-span branching to be completed, at most 500 meters of the branch cable is necessary.

Due to the long excess length of the cable for mid-span branching of prior arts described above, however, there are several problems listed below on usability, workability, and economy in efficient installation of the network.

Firstly, the excess length of cables is generally endured excessively because workers cannot decide exact points of branching when initial installation of the cables. Also, there are the cases when extra branch cables are installed to the access point of the loop/star distribution network because of the lack of the excess length of cables at the points of mid-span branching. Thus, the cost of installation or branching is excessively high.

Secondly, in the case of decision of the incorrect points for branching, ensured excess length of cables must be pulled to the points of mid-span branching or extra branch cables are installed to the points where the excess length of cables has been already endured. Thus the cost for extra installation occurs.

Thirdly, the ensured excess length of cables is of such length that preserved cores are accommodated in the splice closure, which may reduce workability.

Fourthly, unsheathing the slack loop of excess length of the cables takes long time.

Fifthly, the splice closure must have the room for, at least, the allowable radius of curvature of unit of cores with hardened Polybutadien Terephthalate (PBTP), unit of cores having preserved cores. So it is hard to put the unit of cores in order in the splice closure, which reduces reliability of cores of the preserved unit having the cores in operation.

Sixthly, the cables in the manhole cannot be put in order due to the ensured excess length of cables, which may reduce workability. The ensured excess length of cables on the poles also reduces the reliability and a fine view.

SUMMARY OF THE INVENTION

It is, therefore, an object of the present invention to provide a method for mid-span branching that provides marginal length of the existing main cable from which the branch cable branches off without the excess length of cables that forms a slack loop.

To accomplish the above object of the present invention, there is provided a method for mid-span branching of optical fiber cable without excess length of cables, comprising the steps of: setting an existing main cable and a branch cable; unsheathing main branched part and sub branched part of the main cable with preserved part formed between the main branched part and the sub branched part; choosing and cutting branched cores with preserved cores remaining uncut at the main branched part, the branched cores having first branched cores and second branched cores; connecting the first branched cores to first branching cores to make temporary connection, first branching cores in the branch cable; pulling out the temporary connection to the sub branched part through the preserved part; and splicing the first branched cores and the first branching cores at the sub branched part, and splicing the second branched cores and second branching cores at the main branching part, second branching cores in the branch cable.

In accordance with another aspect of the present invention, there is provided a method for mid-span branching of optical fiber cable, comprising the steps of: setting an existing main cable and a branch cable; unsheathing main branched part and sub branched part of the main cable with preserved part formed between the main branched part and the sub branched part; choosing and cutting branched cores with preserved cores remaining uncut at the main branched part, the branched cores having first branched cores and second branched cores; pulling out the first branched cores to the sub branched part through the preserved part; setting hollow member above the preserved part; pulling out first branching cores to the sub branched part through the hollow member, first branching cores in the branch cable; and splicing the first branched cores and the first branching cores at the sub branched part and splicing the second branched cores and second branching cores at the main branched part, second branching cores in the branch cable.

Also, in accordance with another aspect of the present invention, there is provided a method for mid-span branching of optical fiber cable, comprising the steps of: setting an existing main cable and a branch cable; unsheathing main branched part and sub branched part of the main cable, preserved part formed between the main branched part and the sub branched part; choosing and cutting branched cores with preserved cores remaining uncut at the main branched part, the branched cores having first branched cores and second branched cores; pulling out the first branched cores to the sub branched part through the preserved part; aligning end of the branch cable with end of the sub branched part; unsheathing main branching part and sub branching part of the branch cable with second preserved part formed between the main branching part and the sub branching part, main branching part and sub branching part of the branch cable corresponding respectively to the main branched part and the sub branched part of the main cable; pulling out second branching cores to the main branching part through the second preserved part, second branching cores in the branch cable; and splicing the first branched cores and first branching cores at the sub branched part and splicing the second branched cores and the second branching cores at the main branched part, first branching cores in the branch cable.

BRIEF DESCRIPTION OF THE DRAWINGS

The object, features and advantages of the present invention are understood within the context of the description of the preferred embodiments as set forth below. The description of the preferred embodiments is understood within the context of accompanying drawing. Which form a material part of this disclosure, wherein.

DETAILED DESCRIPTION OF THE INVENTION

Preferred embodiments of the present invention will be described in detail referring to the accompanying drawings.

Figure 1A:
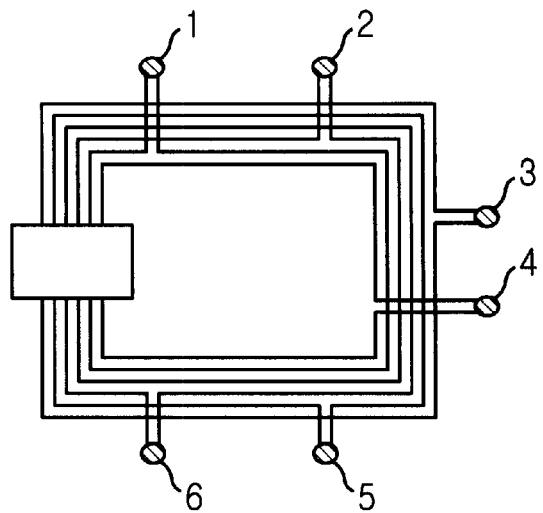
FIGS. 1A and 1B show general distribution of optical fiber cables.
Figure 1B:
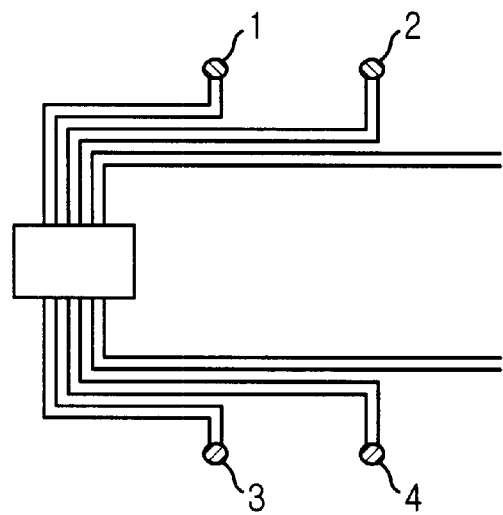
Figure 2A:
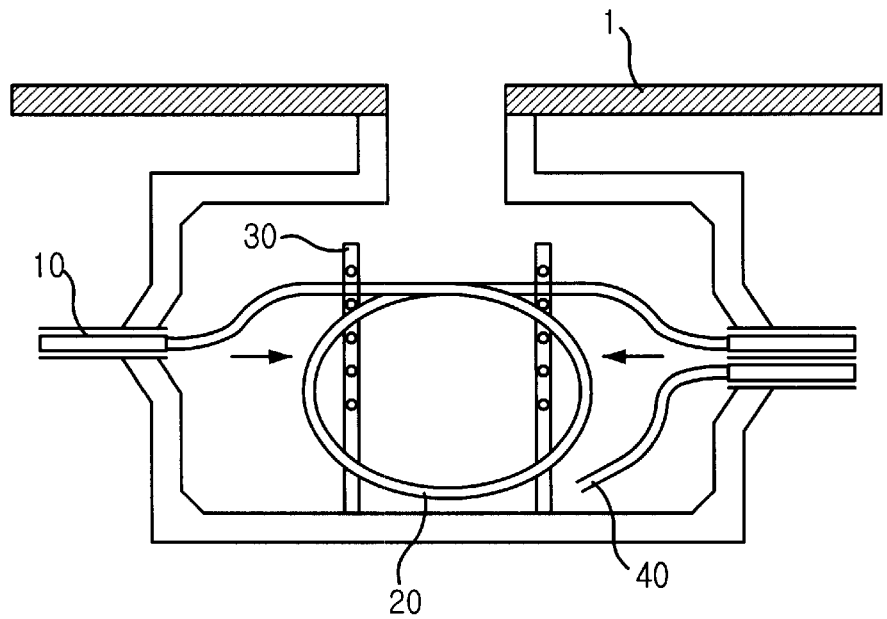
FIGS. 2A and 2B show the mid-span branching method in accordance with prior art.
Figure 2B:
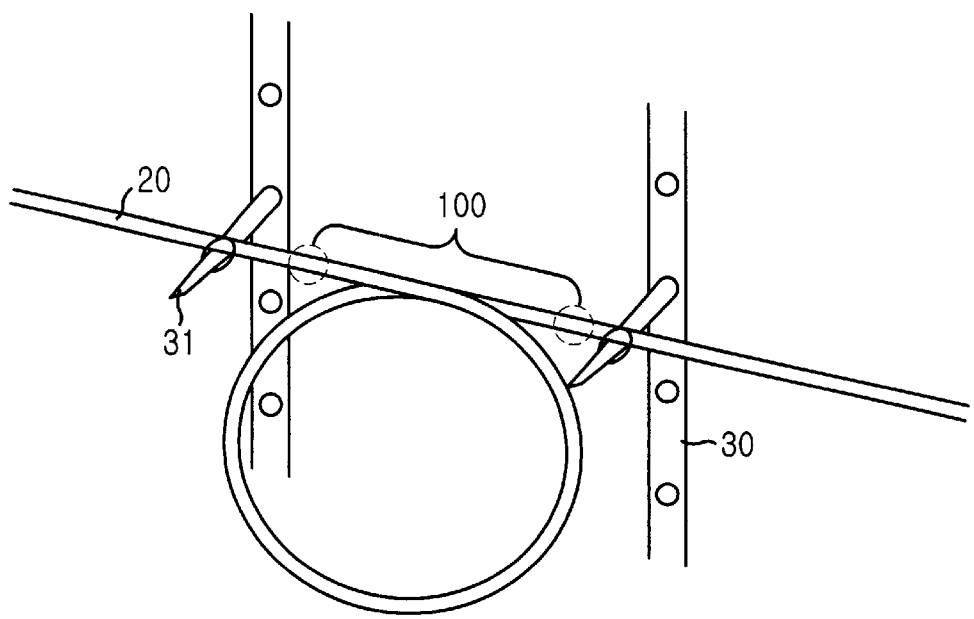
Figure 3:
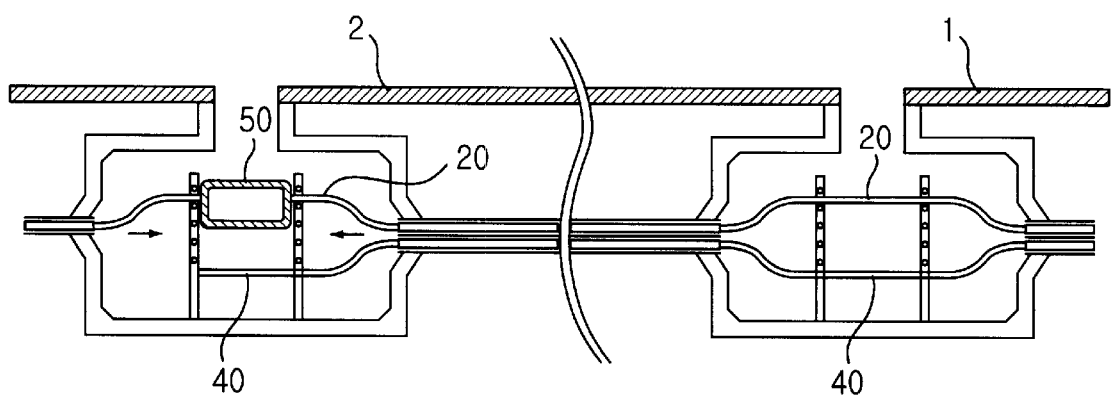
FIG. 3 shows in the access point branching method, branch cable installed in the manhole adjacent to the manhole that is supposed to be the position of mid-span branching.
Figure 4:
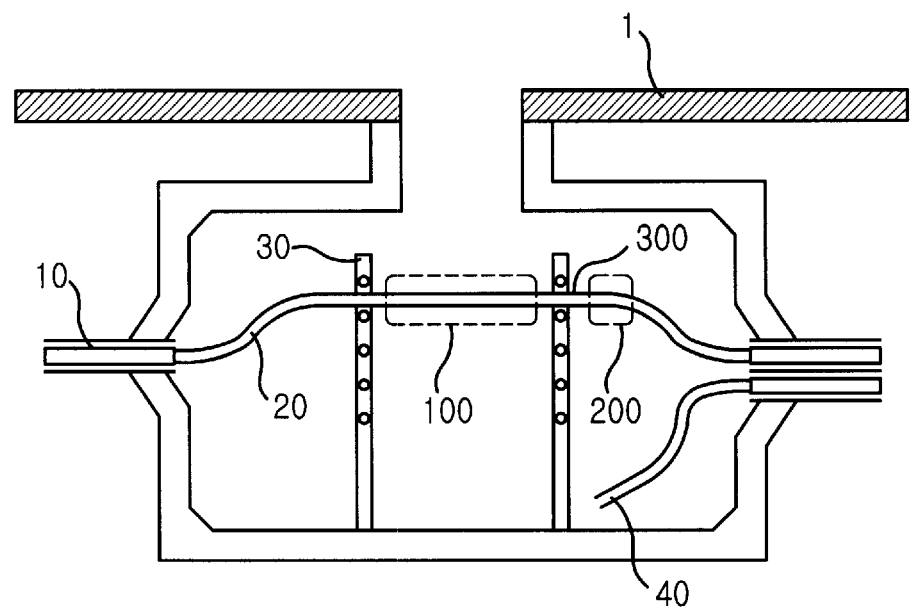
FIG. 4 shows the position of mid-span branching according to present invention.
Figure 5:
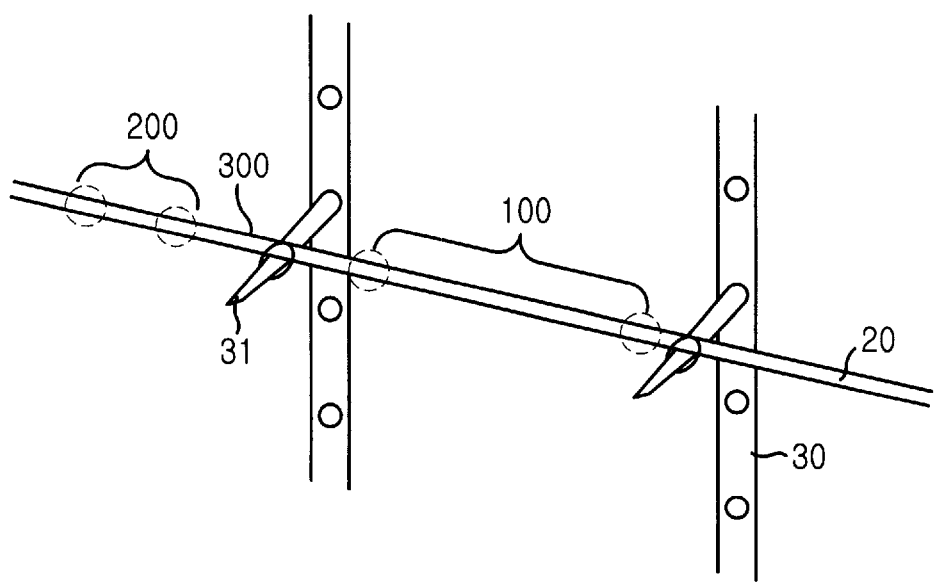
FIG. 5 shows points representing the portion to be unsheathed for the branched parts.

Referring to FIG. 4 and FIG. 5, main cable 20 coming out from the conduit line 10 in the manhole 1 that is the position of mid-span branching is fastened of the prop 31 of supporter 30.

Kept straight in shape, the main cable 20 is unsheathed with the length corresponding to that of main splice closure, forming main branched part 100 at the mid-point of main cable 20.

The main cable 20 is also unsheathed with the length corresponding to that of sub splice closure, forming sub branched part 200 adjacent to the main branched part 100. The main branched part 100 and the sub branched part 200 are separated by preserved part 300.

The length of the main branched part 100 and the sub branched part 200 is no longer than that of the main splice closure and the sub splice closure that accommodates the main branched part 100 and the sub branched part 200 respectively.

The length of preserved part 300 of the main cable is also restricted by space of the manhole 1.

Preferably the length of the main branched part 100 is about 50 cm to 60 cm long, the sub branched part 200 about 25 cm to 30 cm long, and the preserved part 300 about 25 cm to 30 cm long.

The unsheathing step of the main cable 20 and forming step of preserved part 300 and main and sub branched part 100, 200 described above are included in all the embodiments described below.

In first embodiment of the present invention, a method for mid-span branching of loop distribution, the branching cores of the branch cable 40 is pulled out from the main branched part 100 to the sub branched part 200 of the main cable 20 through the preserved part 300.

Figure 6A:
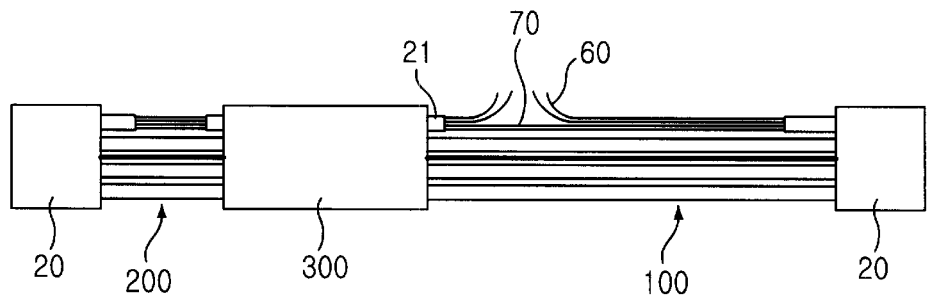
FIGS. 6A to 6I show first embodiment according to present invention.

Referring to FIG. 6A, as described above, kept straight in shape, the main cable 20 is unsheathed with the length corresponding to that of main splice closure, forming main branched part 100 at the mid-point of main cable 20.

The main cable 20 is also unsheathed with the length corresponding to that of sub splice closure, forming sub branched part 200 adjacent to the main branched part 100. The main branched part 100 and the sub branched part 200 are separated by preserved part 300.

Preferably the length of the main branched part 100 is about 50 cm to 60 cm long, the sub branched part 200 about 25 cm to 30 cm long, and the preserved part 300 about 25 cm to 30 cm long.

Also, some portion of the unit of branched cores 21 of the main branched part 100 are selected and cut, thus the unit of branched cores 21 consists of branched cores 60 that are the portion cut and preserved cores 70 that remains uncut. Also, the branched cores 60 consist of the first branched cores 61 and the second branched cores 62.

Figure 6B:
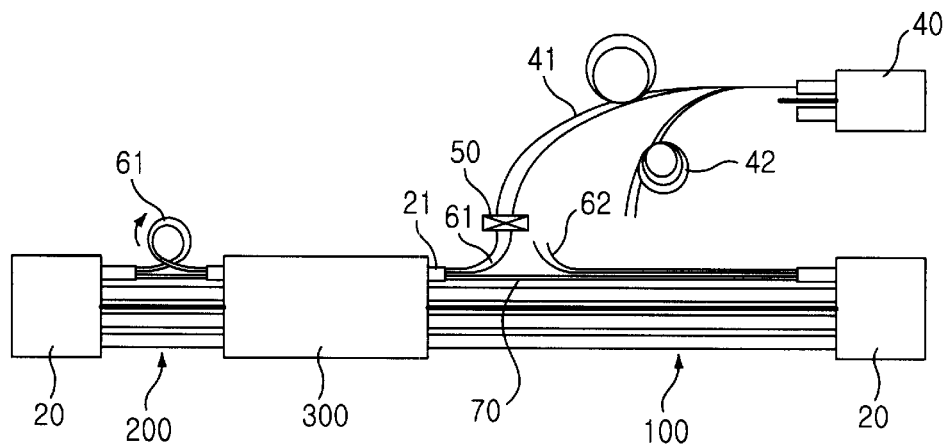

Referring to FIG. 6B, with end of the branch cable 40 aligned with the main branched part 100, the branching cores which consist of the first branching cores 41 and the second branching cores 42 are pulled out from the branch cable 40.

After that, connecting the first branched cores 61 and the first branching cores 41 makes temporary connection.

Figure 6C:
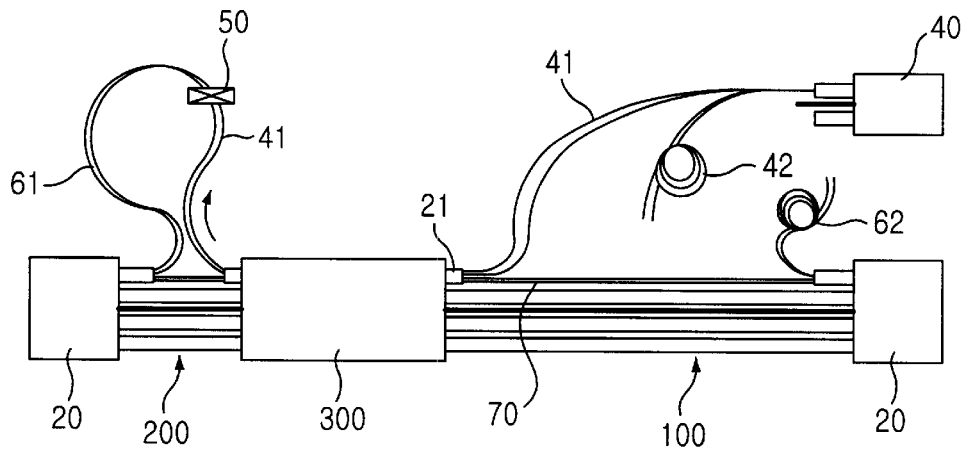
Figure 6D:
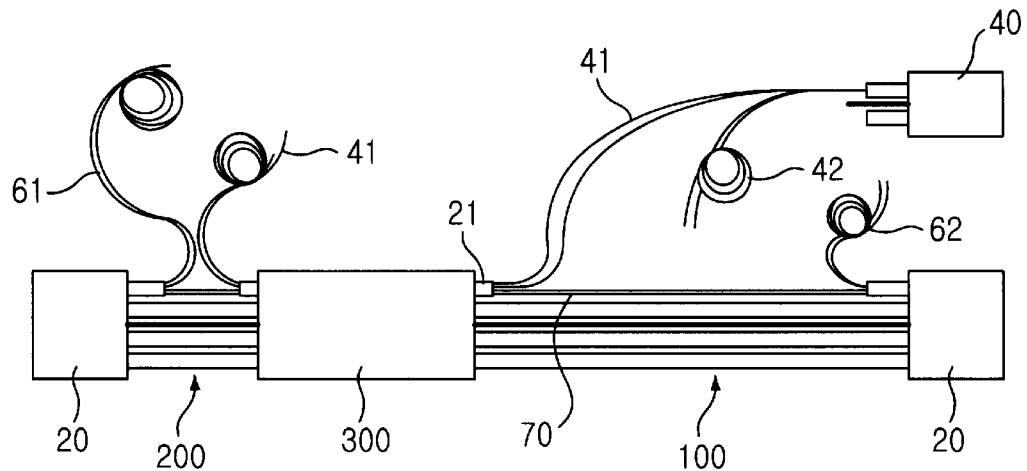

Referring to FIG. 6C and FIG. 6D, the temporary connection is disconnected after the temporary connection is pulled out from the main branched part 100 to the sub branched part 200 through the preserved part 300, thus the first branching cores 41 and the first branched cores 61 are placed in the sub branched part 200.

Figure 6E:
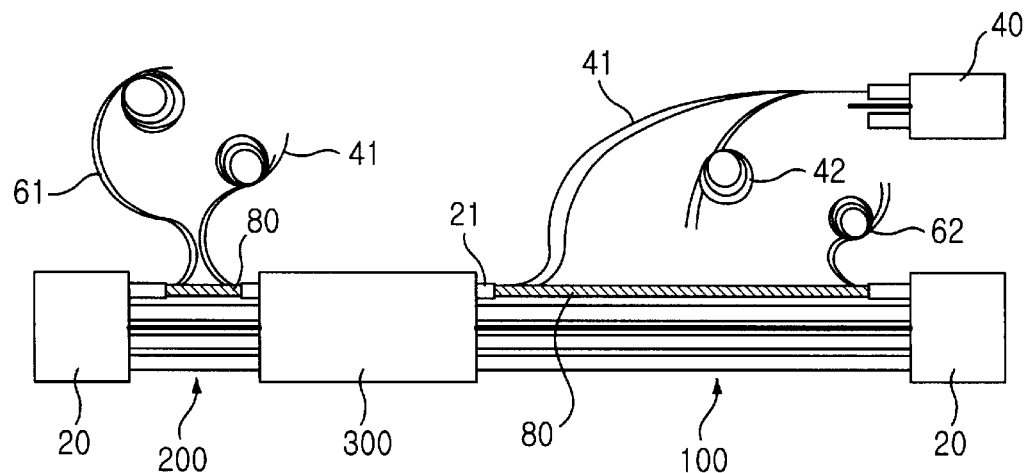

Referring to FIG. 6E, the preserved cores 70 in the main branched part 100 and sub branched part 200 are covered by unit spiral 80 for protection.

Figure 6F:
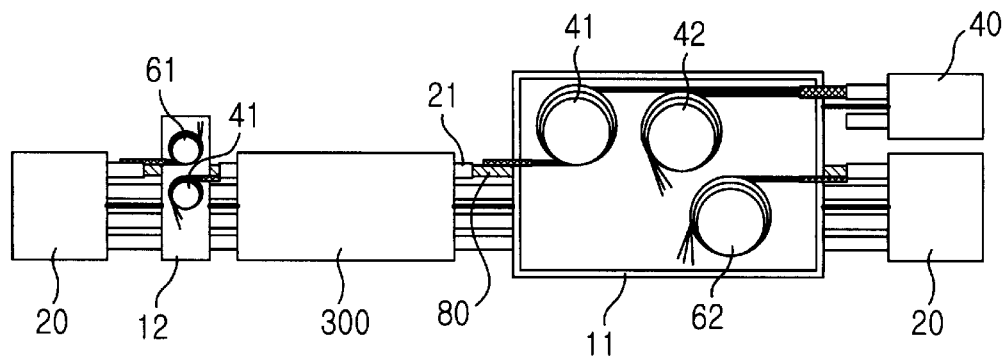

Referring to FIG. 6F, after trays 11 and 12 for protecting and supporting cores are set to the main branched part 100 and sub branched part 200 respectively, the first branched cores 61 and the first branching cores 41 are convolved and arranged on the tray 12 set to the sub branched part 200, and the second branched cores 62 and the second branching cores 42 on the tray 11 set to the main branched part 100.

Figure 6G:
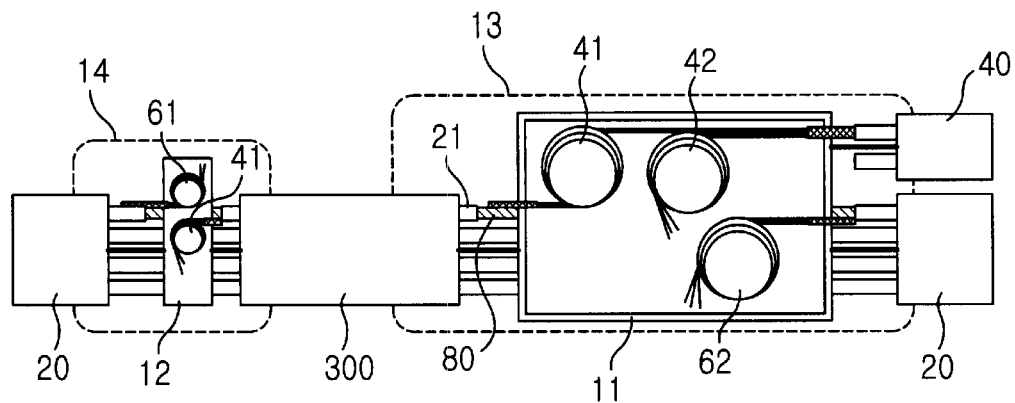

Referring to FIG. 6G, main splice closure 13 and sub splice closure 14 are set so that the main branched part 100 and the sub branched part 200 including the trays 11, 12 are accommodated in the main slice closure 13 and sub splice closure 14 respectively, which makes it possible that the method for mid-span branching is operated without excess length of cables.

Figure 6H:
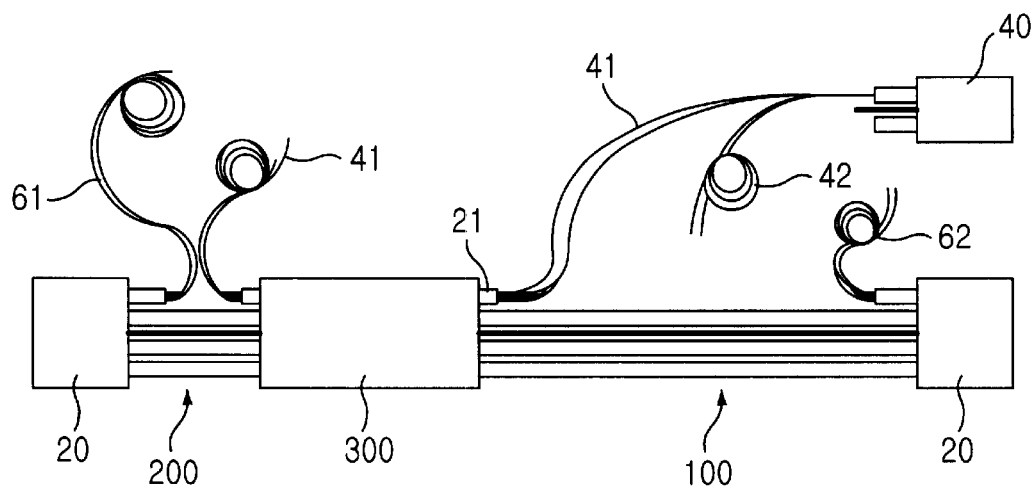
Figure 6I:
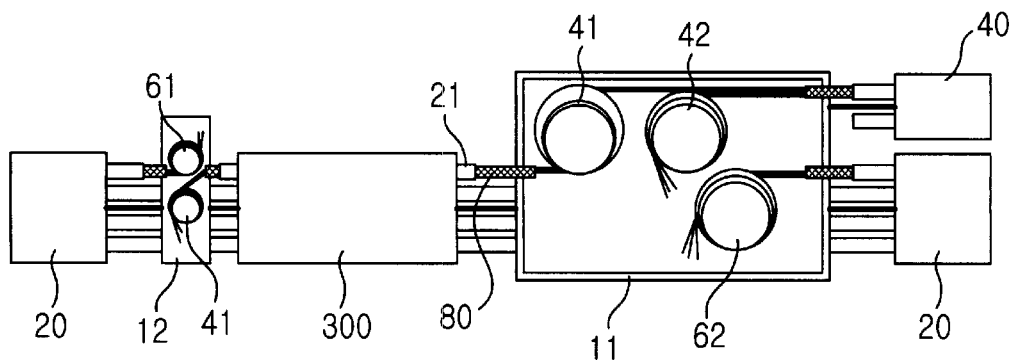

Referring to FIG. 6H and FIG. 6I, in the case of branch of whole cores of a unit in the cable, there is not unit spiral for protection of preserved cores because there are not preserved cores in the main branched part 100 and the sub branched part 200.

In this case, the step of making temporary connection, pulling out the temporary connection from the main branched part 100 to the sub branched part 200 through the preserved part 300, setting trays and convolving and arranging the cores are same as described above except that there is not the step of protecting the preserved cores with the unit spiral.

Figure 7:
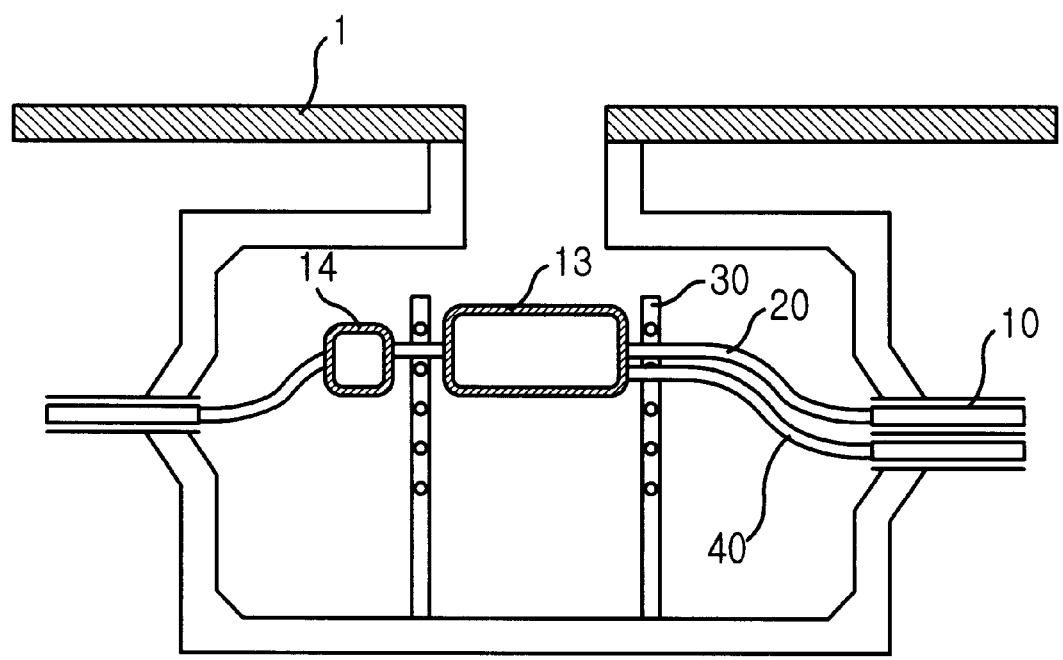
FIG. 7 shows the main and branch cable after applying the first embodiment of present invention

Referring to FIG. 7, after applying the first embodiment of present invention that is the method for mid-span branching with utilization of the branched cores unit 21, both the main splice closure 13 for mid-span branching and the sub splice closure 14 are in line with the main cable 20 in the manhole 1, which also can be installed on the pole. The main splice closure 13 accommodates branch cable 40.

In second embodiment of the present invention that can be applied to the case where the branching cores are difficult to pull out from the main branched part to the sub branched part through the preserved part by the branched cores, the branching cores are easy to place on the main branched part and sub branched part by the extra empty pipe cable.

Figure 8A:
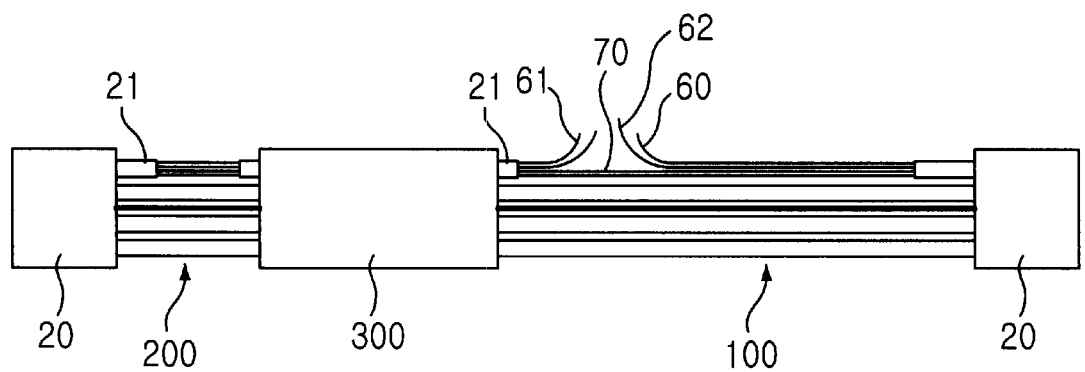
FIGS. 8A to 8G show second embodiment according to present invention.

Referring to FIG. 8A, kept straight in shape, the main cable 20 is unsheathed with the length corresponding to that of main splice closure, forming main branched part 100 at the mid-point of main cable 20.

The main cable 20 is also unsheathed with the length corresponding to that of sub splice closure, forming sub branched part 200 adjacent to the main branched part 100. The main branched part 100 and the sub branched part 200 are separated by preserved part 300.

Preferably the length of the main branched part 100 is about 50 cm to 60 cm long, the sub branched part 200 about 25 cm to 30 cm long, and the preserved part 300 about 25 cm to 30 cm long.

Also, some portion of the unit of branched cores 21 of the main branched part 100 are selected and cut, thus the unit of branched cores 21 consists of branched cores 60 that are the portion cut and preserved cores 70 that remains uncut. Also, the branched cores 60 consist of the first branched cores 61 and the second branched cores 62.

Figure 8B:
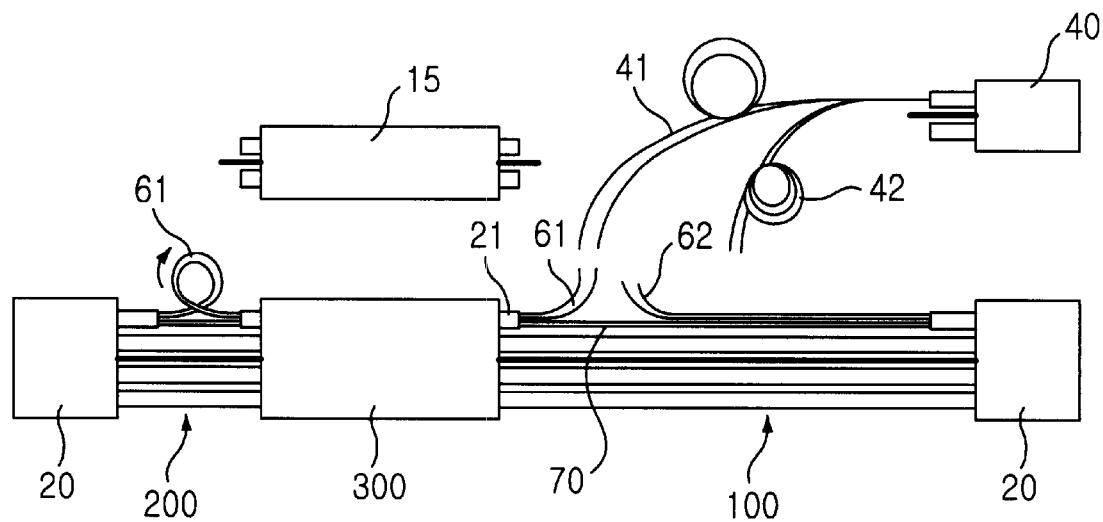

Referring to FIG. 8B, the branch cable with the first branching cores 41 and the second branching cores 42 is aligned with the end of the main branched part 100. Also, empty pipe cable 15 is placed above the preserved part 300.

Figure 8C:
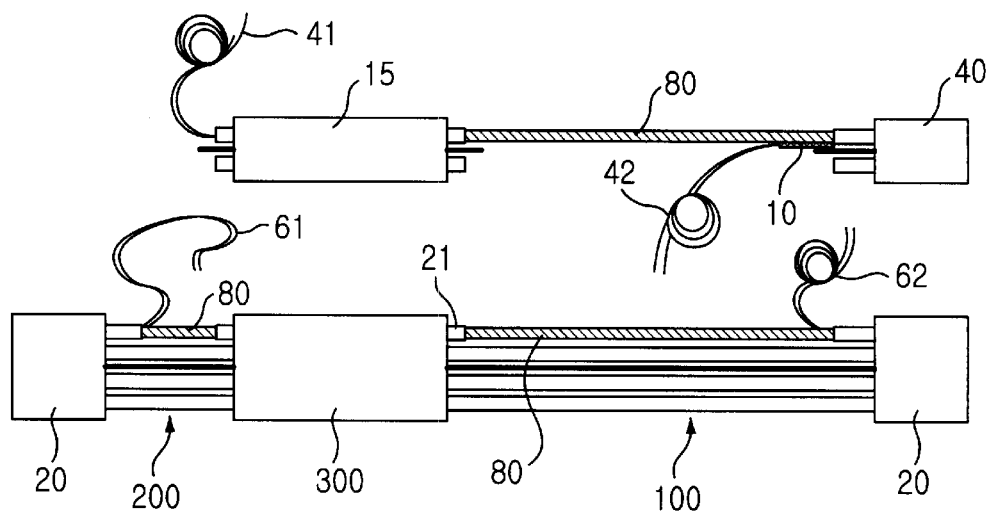

Referring to FIG. 8C, the first branched cores 61 are pulled out from the main branched part 100 to the sub branched part 200 through the preserved part 300, thus the first branched cores 61 are placed in the sub branched part 200.

The first branching cores 41 are also pulled out to the sub branched part 200 through the empty pipe cable 15, thus the first branching cores 41 are placed in the sub branched part 200.

Also, the first branching cores 41 exposed between the empty pipe cable 15 and the branch cable 40 and the preserved cores 70 exposed in the main branched part 100 and the sub branched part 200 are covered with the unit spiral 80 for protection.

Protecting tube 10 also protects the second branching cores 42.

Figure 8D:
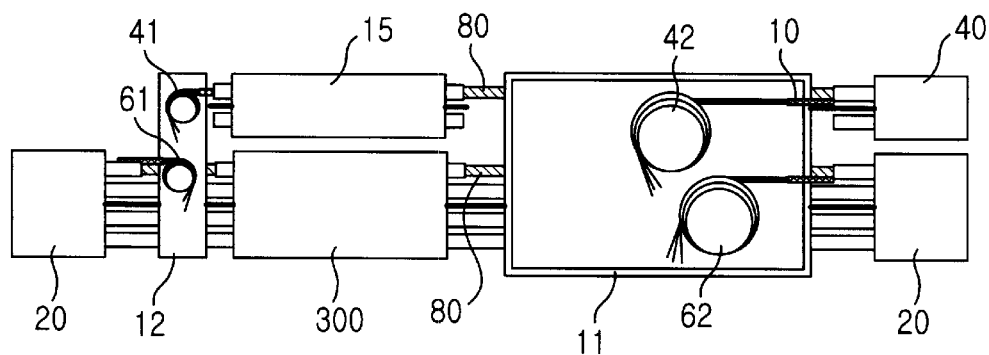

Referring to FIG. 8D, after trays 11 and 12 for protecting and supporting cores are set to the main branched part 100 and sub branched part 200 respectively, the first branched cores 61 and the first branching cores 41 are convolved and arranged on the tray 12 set to the sub branched part 200, and the second branched cores 62 and the second branching cores 42 on the tray 11 set to the main branched part 100.

Figure 8E:
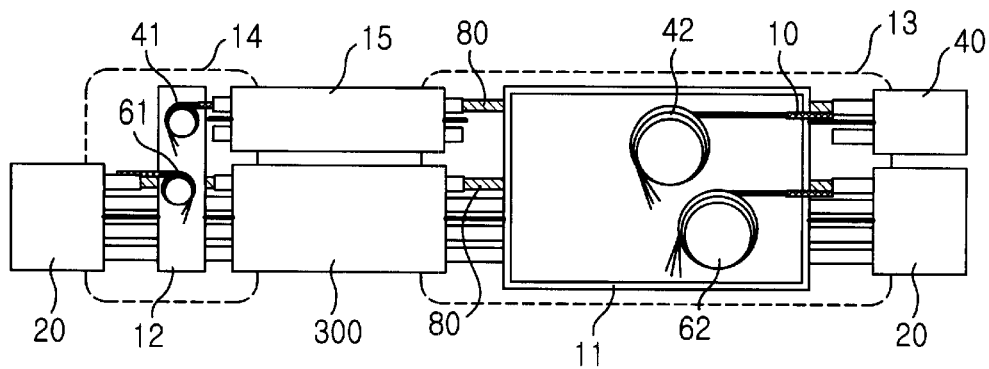

Referring to FIG. 8E, main splice closure 13 and sub splice closure 14 are set so that the main branched part 100 and the sub branched part 200 including the trays 11, 12 are accommodated in the main slice closure 13 and sub splice closure 14 respectively, which makes it possible that the method for mid-span branching is operated without excess length of cables.

Figure 8F:
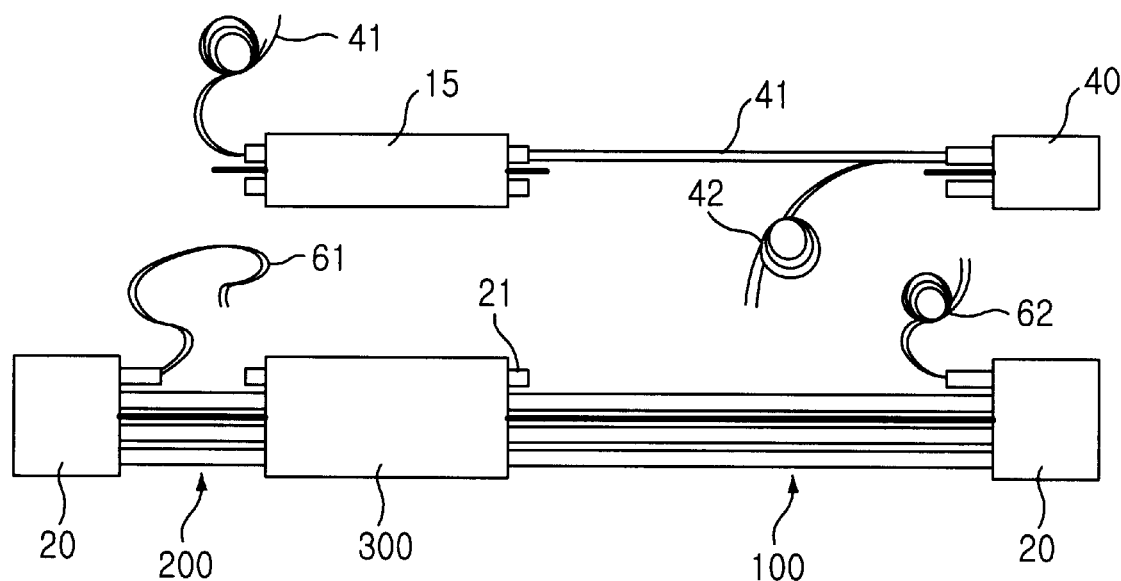
Figure 8G:
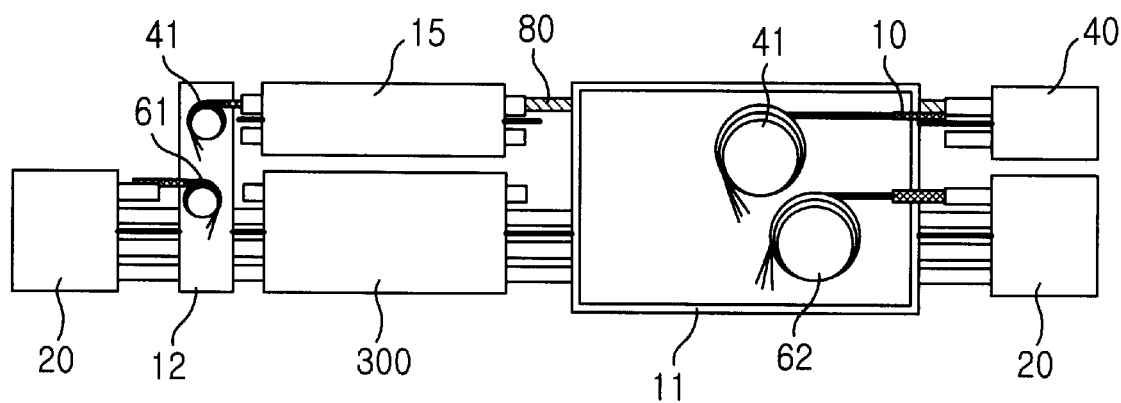

Referring to FIG. 8F, and FIG. 8G, in the case of branch of whole cores of a unit in the cable, there is not unit spiral for protection of preserved cores because there are not preserved cores in the main branched part 100 and the sub branched part 200.

In this case, the step of setting the empty pipe cable 15, pulling out the first branched cores 61 from the main branched part 100 to the sub branched part 200 through the preserved part 300, pulling out the first branching cores 41 to the sub branched part 200 through the empty pipe cable 15, setting trays and convolving and arranging the cores are same as described above except that there is not the step of protecting the preserved cores by the-unit spiral.

Figure 9:
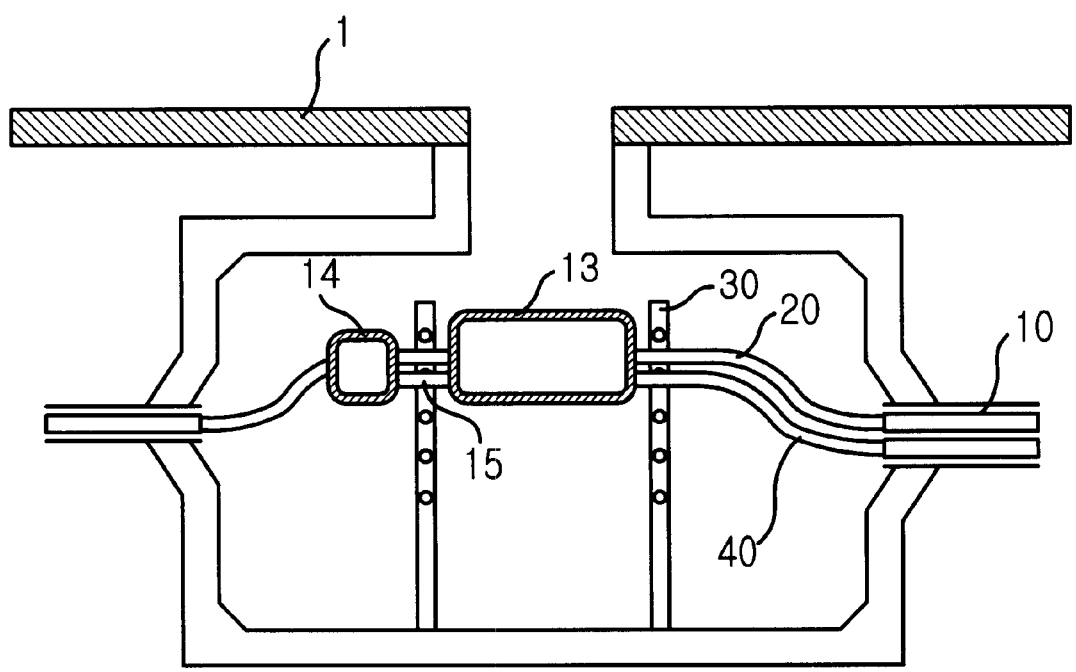
FIG. 9 shows the main and branch cable after applying the second embodiment of present invention.

Referring to FIG. 9, after applying the second embodiment of present invention that is the method for mid-span branching with utilization of the empty pipe cable 15, both the main splice closure 13 for mid-span branching and the sub splice closure 14 are in line with the main cable 20 in the manhole 1, which also can be installed on the pole. The main splice closure 13 accommodates branch cable 40.

The main cable 20 and the empty pipe cable 15 connect the main splice closures 13 for mid-span branching and the sub splice closure 14.

In third embodiment of the present invention that can be applied to the case where the branching cores are difficult to pull out from the main branched part to the sub branched part through the preserved part by the branched cores, the branching cores are easy to place on the main branched part and sub branched part by the branch cable itself.

The difference between the second embodiment and the third embodiment is that predetermined portions of branch cable corresponding respectively to the main branched part and the sub branched part of the main cable are unsheathed, the unsheathed portions of the branch cable forming second preserved part, main branching part and sub branching part of the branch cable, which the third embodiment does not need extra empty pipe cable.

Figure 10A:
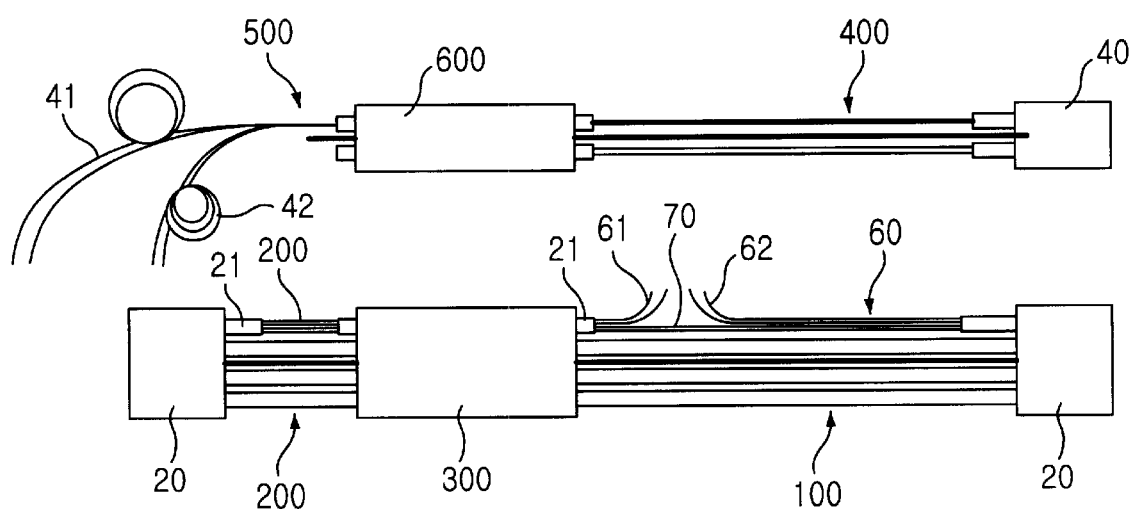
FIGS. 10A to 10G show third embodiment according to present invention.

Referring to FIG. 10A, kept straight in shape, the main cable 20 is unsheathed with the length corresponding to that of main splice closure, forming main branched part 100 at the mid-point of main cable 20.

The main cable 20 is also unsheathed with the length corresponding to that of sub splice closure, forming sub branched part 200 adjacent to the main branched part 100. The main branched part 100 and the sub branched part 200 are separated by preserved part 300.

Preferably the length of the main branched part 100 is about 50 cm to 60 cm long, the sub branched part 200 about 25 cm to 30 cm long, and the preserved part 300 about 25 cm to 30 cm long.

Also, some portion of the unit of branched cores 21 of the main branched part 100 are selected and cut, thus the unit of branched cores 21 consists of branched cores 60 that are the portion cut and preserved cores 70 that remains uncut. Also, the branched cores 60 consist of the first branched cores 61 and the second branched cores 62.

The end of the branch cable 40 is placed on the sub branched part 200, and the branch cable 40 is unsheathed with the length corresponding to that of main splice closure, forming main branching part 400 at the mid-point of the branch cable 40.

The branch cable 40 is also unsheathed with the length corresponding to that of sub splice closure, forming sub branching part 500 adjacent to the main branching part 400. The main branching part 400 and the sub branching part 500 are separated by second preserved part 600.

The position of the main branching part 400, the sub branching part 500 and the second preserved part 600 correspond to the main branched part 100, the sub branched part 200 and the preserved part 300 respectively.

Therefore the first branching cores 41 and the second branching cores 42 in the sub branching part 500 are placed on the side of the sub branched part 200.

Figure 10B:
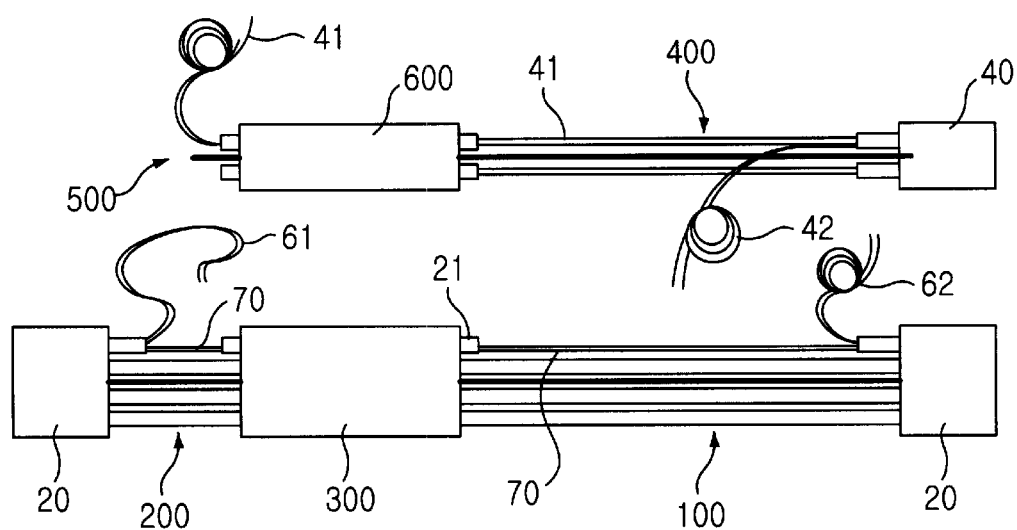

Referring to FIG. 10B, the second branching cores 42 are pulled out from the sub branching part 200 to the main branching part 400 through the second preserved part 600.

Therefore the first branching cores 41 in the sub branching part 500 are placed on the side of the sub branched part 200 and the second branching cores 42 in the main branching part 400 are placed on the side of the main branched part 100.

Figure 10C:
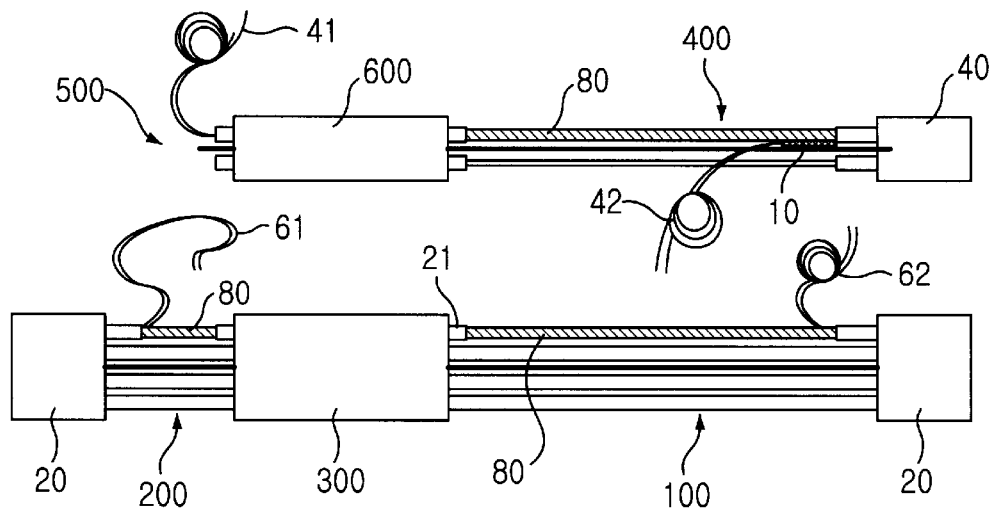

Referring to FIG. 10C, the first branching cores 41 exposed in the main branching part 400, the preserved cores 70 exposed in the main branched part 100 and the sub branched part 200 are covered with the unit spiral 80 for protection.

Protecting tube 10 also protects the second branching cores 42 in the main branching part 400.

Figure 10D:
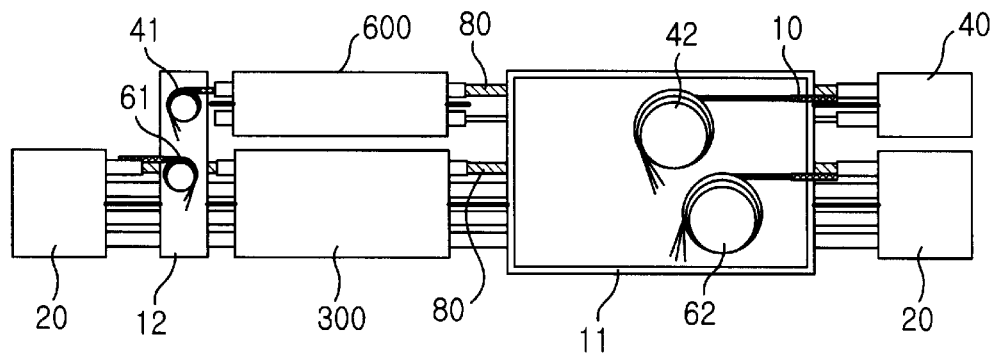

Referring to FIG. 10D, after trays 11 and 12 for protecting and supporting cores are set to the main branched part 100 and sub branched part 200 respectively, the first branched cores 61 and the first branching cores 41 are convolved and arranged on the tray 12 set to the sub branched part 200, and the second branched cores 62 and the second branching cores 42 on the tray 11 set to the main branched part 100.

Figure 10E:
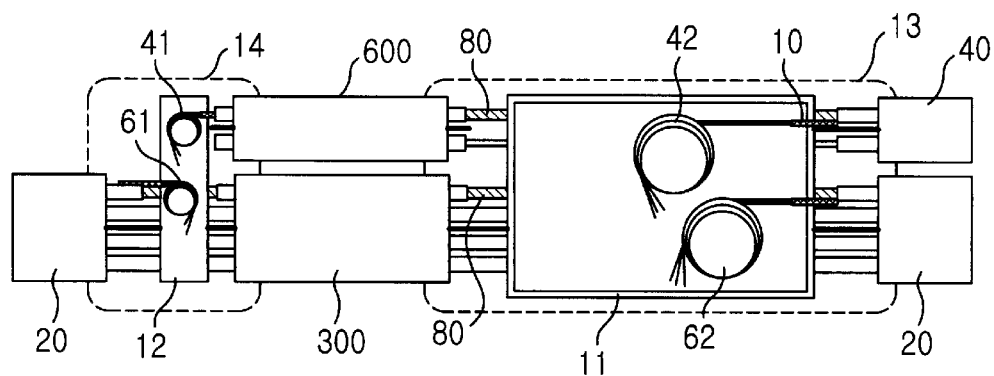

Referring to FIG. 10E, main splice closure 13 and sub splice closure 14 are set so that the main branched part 100 and the sub branched part 200 including the trays 11, 12 are accommodated in the main slice closure 13 and sub splice closure 14 respectively, which makes it possible that the method for mid-span branching is operated without excess length of cables.

Figure 10F:
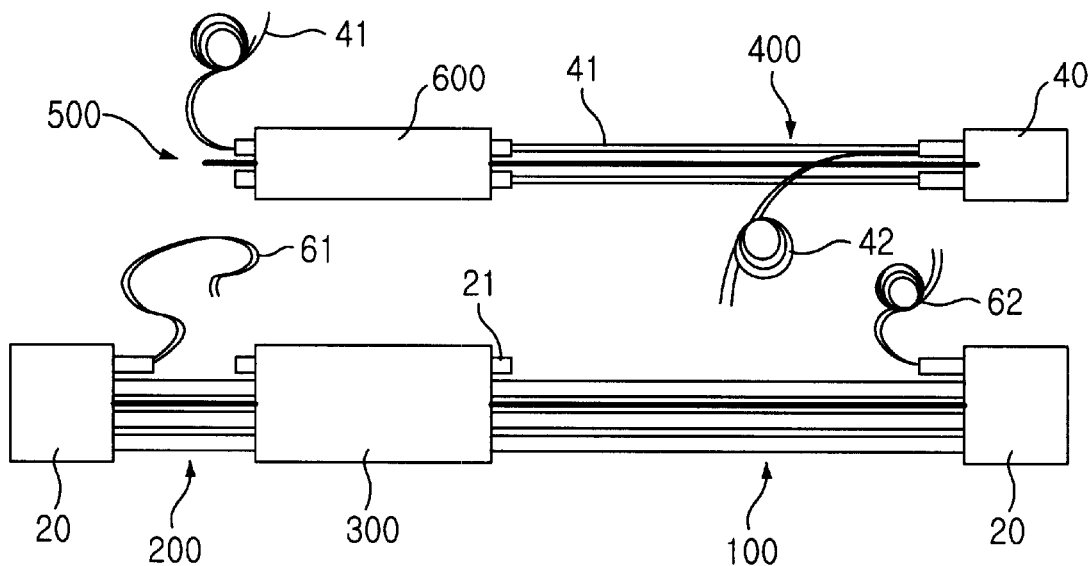
Figure 10G:
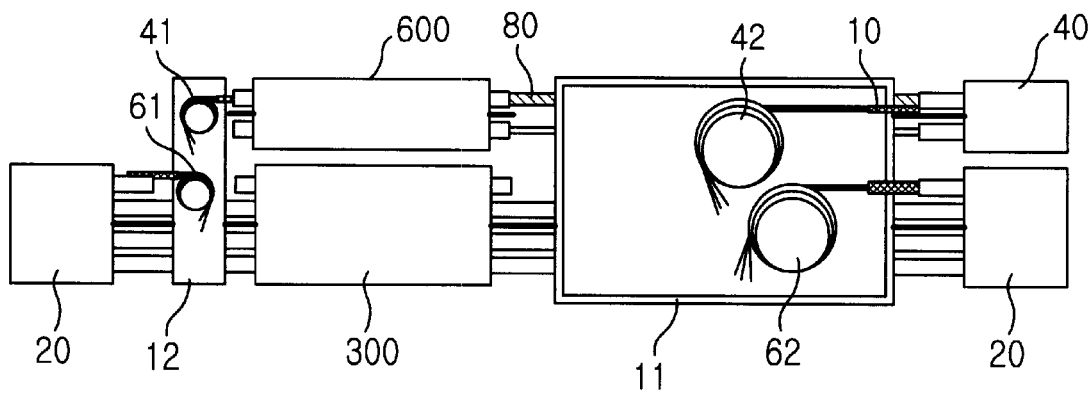

Referring to FIG. 10F and FIG. 10G, in the case of branch of whole cores of a unit in the cable, there is not unit spiral for protection of preserved cores because there are not preserved cores in the main branched part 100 and the sub branched part 200.

In this case, the step of forming the main branching part 400, the sub branching part 500 and the second preserved part 600, pulling out the first branched cores 61 from the main branched part 100 to the sub branched part 200 through the preserved part 300, pulling out the second branching cores 42 from the sub branching part 500 to the main branching part 400 through the second preserved part 600, setting trays and convolving and arranging the cores are same as described above except that there is not the step of protecting the preserved cores by the unit spiral.

Figure 11:
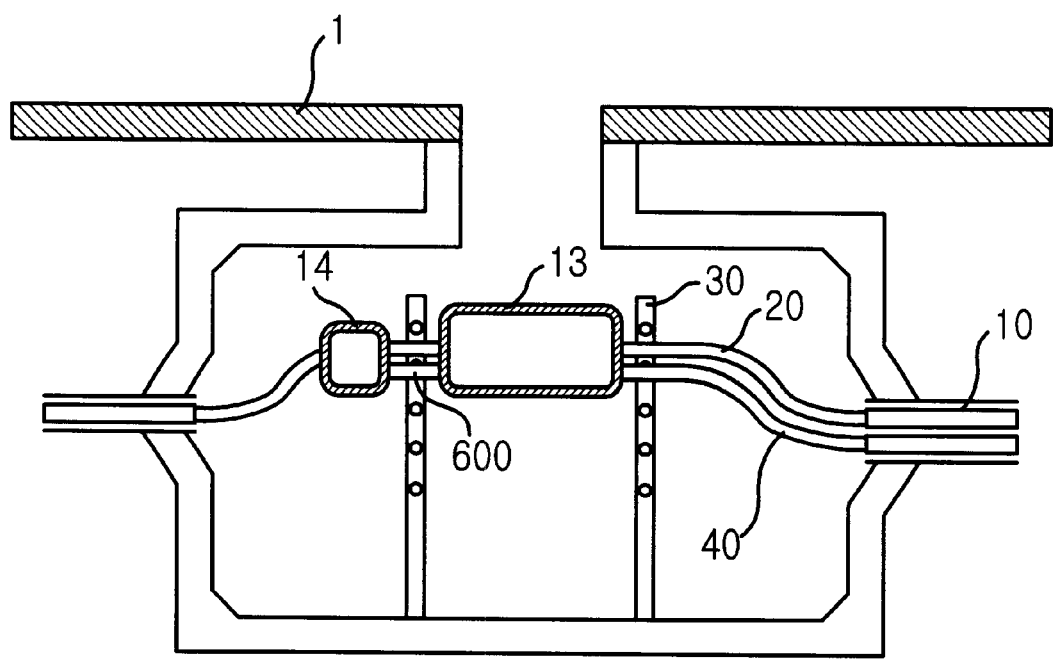
FIG. 11 shows the main and branch cable after applying the third embodiment of present invention.

Referring to FIG. 11, after applying the third embodiment of present invention that is the method for mid-span branching with utilization of the branch cable 40, both the main splice closure 13 for mid-span branching and the sub splice closure 14 are in line with the main cable 20 in the manhole 1, which also can be installed on the pole. The main splice closure 13 accommodates branch cable 40.

The main cable 20 and the branch cable 40 connect the main splice closures 13 for mid-span branching and the sub splice closure 14.

Accordingly, when the methods in accordance with the present invention is applied to the networks of loop distribution, star distribution, or other distribution, the branching cores in the branch cable can be connected to the main cable with ease without excess length of cable. Also, the main and the branch cable are easily arranged after connection. When additional demand for cores arises, the mid-span branching is operated efficiently by opening the main and sub splice closure, pulling out the branched cores from the main cable, and splicing the branched cores of the main cable and the branching cores of the branch cable.

Therefore, by the methods in accordance with the present invention, planning of cable distribution of the networks is established without difficulty because there is no need for predicting the position of mid-span branching for future service demand.

The cost for setting excess length of cable does not occur due to the absence of the excess length of cable, which reduces cost for network-installation and mid-span branching.

The reliability of the optical fiber cores increases also due to the absence of the excess length of cable that needs the room for, at least, the allowable radius of curvature of unit of cores in the prior arts.

The efficiency of maintenance and workability of network-installation and mid-span branching can increase due to easy acceptance of additional demand for cores by the methods in accordance with the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of mid-span branching of optical fiber cable, comprising:

setting an existing main cable and a branch cable;

unsheathing a main branched part and a sub branched part of the main cable with a preserved part formed between the main branched part and the sub branched part;

choosing and cutting branched cores with preserved cores remaining uncut at the main branched part, the branched cores having first branched cores and second branched cores;

connecting the first branched cores to first branching cores to make a temporary connection in the main branched part, the first branching cores located in the branch cable;

pulling out the temporary connection in the main branched part to the sub branched part through the preserved part; and splicing the first branched cores and the first branching cores at the sub branched part, and splicing the second branched cores and second branching cores at the main branching part, the second branching cores located in the branch cable.

2. The method of claim 1, further comprising step of covering the preserved cores in the main branched part and the sub branched part with sheathing member.

3. The method of claim 2, further comprising step of setting trays to the main branched part an sub branched part respectively, and arranging the branched cores and branching cores on the trays.

4. The method of claim 3, wherein the cutting step cuts the branched cores so that the length of the first branched cores exposed is same as the length of the second branched cores exposed.

5. The method of claim 4, wherein the length of the preserved part and the sub branched part is respectively about 25 to 30 centimeters long, and the length of the main branched part is about 50 to 60 centimeters long.

6. A method of mid-span branching of optical fiber cable, comprising:

setting an existing main cable and a branch cable;

unsheathing a main branched part and a sub branched part of the main cable with a preserved part formed between the main branched part and the sub branched part;

choosing and cutting branched cores with preserved cores remaining uncut at the main branched part, the branched cores consisting of first branched cores and second branched cores;

pulling out the first branched cores in the main branched part to the sub branched part through the preserved part;

setting a hollow member above the preserved part;

pulling out first branching cores to the sub branched part through the hollow member, the first branching cores located in the branch cable; and splicing the first branched cores and the first branching cores at the sub branched part and splicing the second branched cores and second branching cores at the main branched part, the second branching cores located in the branch cable.

7. The method of claim 6, further comprising step of covering preserved cores in the main branch part and sub branched part with sheathing member.

8. The method of claim 7, further comprising step of covering the first branching cores between the hollow member and the branched part with sheathing member.

9. The method of claim 8, further comprising step of setting trays to the main branched part and sub branched part respectively, and arranging the branch ed cores and branching cores on the trays.

10. The method of claim 9, wherein the cutting step cuts the branch ed cores so that the length of the first branched cores exposed is same as the length of the second branched cores exposed.

11. The method of claim 10, wherein the length of the preserved part and the sub branched part is respectively about 25 to 30 centimeters long, and the length of the main branched part is about 50 to 60 centimeters long.

12. The method of claim 11, wherein the hollow member is tube cable or empty pipe cable.

13. A method of mid-span branching of optical fiber cable, comprising:

setting an existing main cable and a branch cable;

unsheathing a main branched part and a sub branched part of the main cable, a preserved part formed between the main branched part and the sub branched part;

choosing and cutting branched cores with preserved cores remaining uncut at the main branched part, the branched cores consisting of first branched cores and second branched cores;

pulling out the first branched cores in the main branched part to the sub branched part through the preserved part;

aligning an end of the branch cable with an end of the sub branched part;

unsheathing a main branching part and a sub branching part of the branch cable with a second preserved part formed between the main branching part and the sub branching part, the main branching part and the sub branching part of the branch cable corresponding respectively to the main branched part and the sub branched part of the main cable;

pulling out second branching cores to the main branching part through the second preserved part, the second branching cores located in the branch cable; and splicing the first branched cores and first branching cores at the sub branched part and splicing the second branched cores and the second branching cores at the main branched part, the first branching cores located in the branch cable.

14. The method of claim 13, further comprising step of covering preserved cores in the main branched part with sheathing member.

15. The method of claim 14, further comprising step of covering the first branching cores in the main branching part with sheathing member.

16. The method of claim 15, further comprising step of setting trays to the main branched part and sub branched part respectively, and arranging the branched cores and branching cores on the trays.

17. The method of claim 16, wherein the cutting step cuts the branched cores so that the length of the first branched cores exposed is same as the length of the second branched cores exposed.

18. The method of 17, claim wherein the length of the preserved part and the sub branched part is respectively about 25 to 30 centimeters long, and the length of the main branched part is about 50 to 60 centimeters long.

* * * * *